May 5, 1931.  B. W. DENNIS  1,803,665

EXPANSION JOINT OR COUPLING

Filed Dec. 24, 1925   2 Sheets-Sheet 1

Inventor
B. W. Dennis

May 5, 1931. B. W. DENNIS 1,803,665
EXPANSION JOINT OR COUPLING
Filed Dec. 24, 1925   2 Sheets-Sheet 2
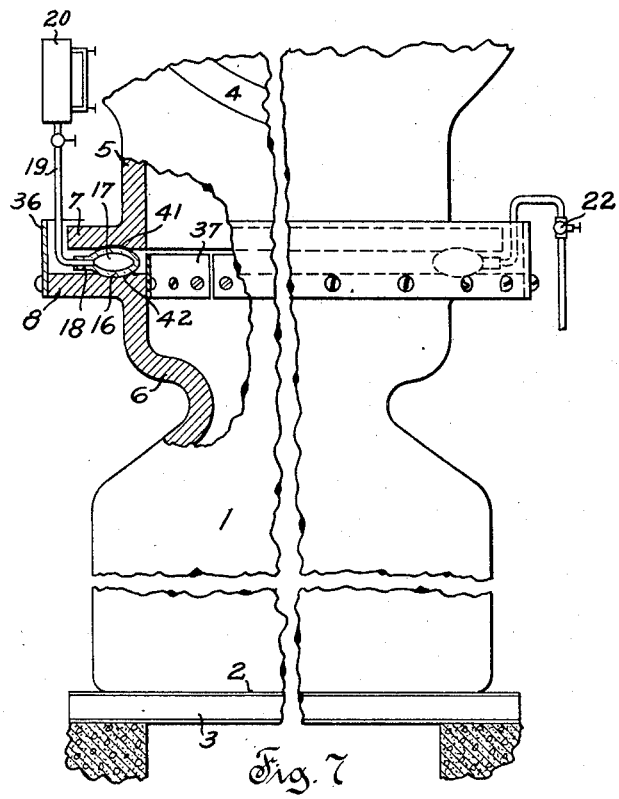
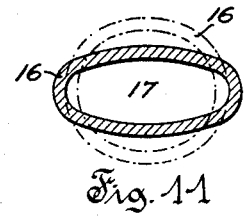
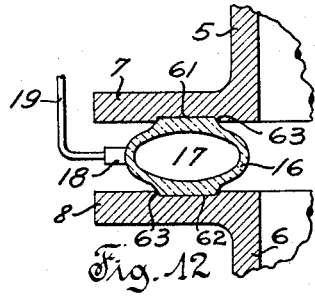
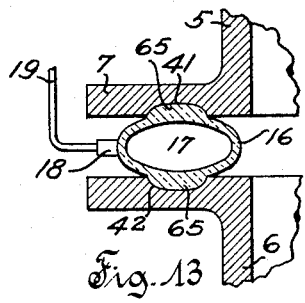
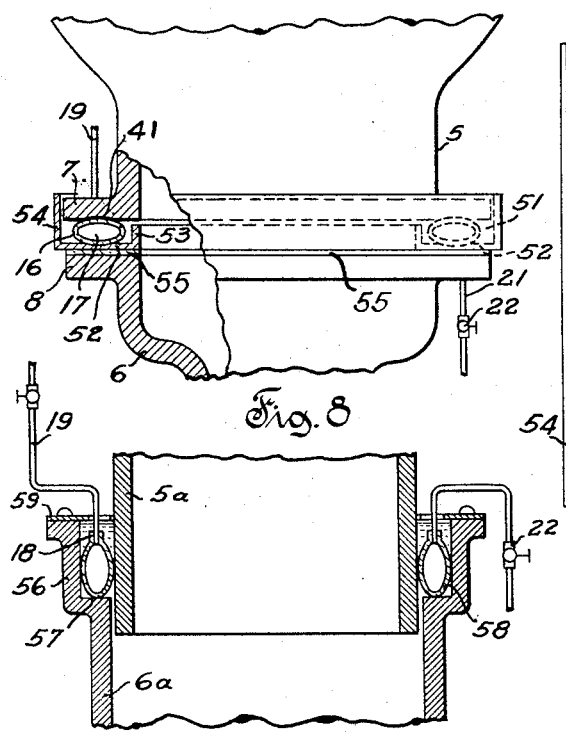
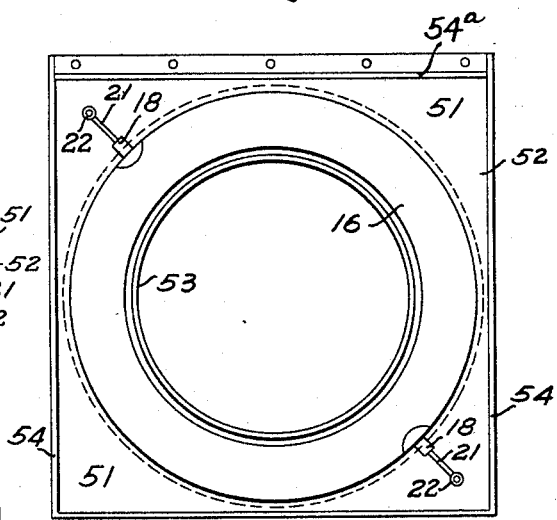

Patented May 5, 1931

1,803,665

UNITED STATES PATENT OFFICE

BASIL W. DENNIS, OF COLUMBUS, OHIO

EXPANSION JOINT OR COUPLING

Application filed December 24, 1925. Serial No. 77,632.

This invention relates in general to expansion joints or couplings, and it has more particular relation to such devices which are of the fluid pressure controlled or actuated type, and specific features thereof.

The invention contemplates the production of a fluid-tight sealing gasket or coupling of improved form for use between sections of a conduit, such as the exhaust of a turbine or engine and a condenser associated therewith, which are subjected to operating conditions which may cause variation in the distance between the ends of said conduit sections, the gasket being of such a type as insures a fluid-tight seal between the adjacent conduit sections even under such operating conditions as cause the ends of the conduits to approach and recede from each other to a considerable extent.

One of the important objects of the invention is to provide a non-leakable connection of improved form between fluid conductors of the character indicated which will accommodate any increase or decrease in their dimensions due to expansion or contraction under varying temperatures.

A further object of the invention is the provision of improved means for affording a fluid-tight joint between conduit members and of a character permitting an exceptionally wide variation in the distance between said members without any substantial change in pressure at the joint.

A further object of the invention is to obtain in a fluid-tight joint of the hereinabove described character substantial uniformity of pressure completely around the conduit joint under different relative positions of the conduit members and in spite of any tendency to misalinement of the latter.

Other objects will be in part obvious and in part pointed out particularly hereinafter.

The invention accordingly consists in the various features of construction, combination of elements, and arrangement of parts, which will be exemplified by the constructions hereinafter set forth, and the scope of the application of which will be indicated by the following claims. In certain aspects the invention may be considered as involving improvements upon the type of joint disclosed in applicant's copending application Serial No. 389,338 (Patent No. 1,674,277).

In the drawings, wherein are represented a few of the various possible embodiments of the invention:

Fig. 1 is a view in elevation, partly in section, of a joint or coupling, and shows an adaptation of the invention between a turbine engine and a condenser.

Figs. 2 and 3 are views in vertical section showing modifications of the invention.

Figs. 4, 5, 7 and 8 are views in elevation, partly in section, showing further modifications of the invention.

Fig. 9 is a plan view of the joint or coupling shown in Fig. 8.

Figs. 6 and 10 are fragmental vertical sections of further modifications of the invention.

Fig. 11 is a view in vertical cross section of a detail of the joint or coupling shown in Figs. 1, 3, 4, 5, 6, 7, 8 and 9.

Figs. 12 and 13 are views in vertical section showing modified forms of a detail of apparatus embodying the present invention.

Referring more particularly to the drawings wherein similar reference characters refer to similar parts throughout the several views, it will be noted that in Fig. 1, a condenser 1 is shown with its base 2 resting on any rigid form of support 3. In juxtaposition with the condenser, a turbine engine 4 is arranged so that a discharge end or nozzle 5 of the turbine is flexibly connectible with a receiving portion 6 of the condenser. Around the peripheries of the turbine nozzle and the condenser receiver are flanges 7 and 8, respectively, equipped with a plurality of bolt holes such as 9 and 10, respectively. These flanges may extend internally or externally as desired, but they are here represented as extending inwardly and are separated as will hereinafter appear. Through corresponding bolt holes are passed bolts 11, of suitable diameter and length to permit of slight sidewise movement in the holes and to provide a portion 12 extending beyond a flange. A washer 13, and a spring 14 are placed loosely around each extending portion and these parts are held in position by a nut 15 on each bolt. Lying between and separating the flanges 9 and 10 is a flexible or deformable gasket or packing 16, preferably of resilient rubber, having an internal cavity 17 extending throughout its entire length, this gasket, when in operative position, serving to provide a fluid-tight seal for the contents of conduit sections 5 and 6. A pressure-exerting fluid may be introduced into this cavity through a nipple 18 integral with the gasket. In the embodiment of the invention herein illustrated, the nipple 18 is shown connected by a tube 19 to a pressure maintaining apparatus 20, here shown in the form of a reservoir receptacle under suitable substantially constant pressure or head. Another similar nipple 21 is provided, and a discharge conduit is connected thereto and furnished with a control valve 22 to permit drawing off of the fluid, or, if desired, to regulate a constant circulation of the fluid through the gasket. Certain advantages may be attained, where a partial vacuum exists within the conduit sections 5 and 6, with the interior of the gasket subjected to atmospheric pressure, or the inherent resiliency of the gasket, along with atmospheric or other pressure within the gasket, may serve to maintain the fluid-tight seal between the exterior of the gasket and the adjacent flanges of the conduit sections 5 and 6.

In practise, it has been found that any undue strains placed on the turbine casing are apt to cause interference between it and the revolving wheels or runners, and various means have been provided for the purpose of relieving such strains. Different types of joints have been devised, and supports comprising yielding means have been used. In the embodiment of the invention herein illustrated, the entire condenser is carried by rigid supporting means at its base, thus relieving any strains due to the weight of the condenser and its contents. The turbine is also supported, in a manner not shown, so that its weight need not be considered. This leaves only the strains due to expansion and contraction of the units, and these are compensated for in the following manner: The turbine and condenser are placed in juxtaposition as determined by their calculated spaced relation. The empty gasket is next placed between the flanges. With a gasket of a normally oval or flattened cross-sectional shape and intended to be maintained inflated to some degree while in operative position between the conduit sections, the gasket, when in normal deflated condition, may be readily inserted to operative position through movement of the same transversely of the axis of the conduit sections; however, should the conduit sections be in such condition of relative approach as to make the same desirable or necessary, the gasket may be further flattened or contracted, as by applying external pressure or internal vacuum thereto, during the insertion of the gasket to operative position between the flanges of the conduit sections. After insertion to the operative position between the conduit flanges, the gasket may be relieved of any contracting influence and permitted to assume normal sealing relation with respect to the end flanges of the conduit sections, as indicated. The bolts 11 may then be passed through the flanges, and the washers, springs and nuts loosely assembled. The nuts are turned down until the springs, preferably of calibrated type, exert a pressure opposite to the pre-estimated pressure of the gasket. Fluid is then introduced to the cavity of the gasket until a predetermined pressure therein is obtained. It is to be noted that in this condition, the external forces acting on the turbine and condenser are substantially constant.

With the gasket of the embodiment of the invention considered in this figure of a normal cross-sectional shape corresponding to an oval having its greater dimension in a plane transverse to the axis of the conduits, the size and shape of the gasket being such that with the conduit sections separated to the maximum extent attainable in normal operation of, for instance, a steam turbine, there is contact over a substantial surface between the gasket and the end flange of each conduit, with a low positive pressure preferably used within the gasket. Likewise, the characteristics of this gasket are preferably such that when the conduit sections are in positions of nearest mutual approach the gasket is not fully flattened or doubled on itself, there being considerable fluid-occupying space within the gasket.

As the turbine is started and a vacuum is created in the condenser, more or less fluid may be delivered to the gasket to compensate for any slight give or stretch therein caused by the vacuum. As the units heat up and expand, they move slightly toward one another, decreasing the axial length of the coupling, and subject the gasket to additional compression the flexible side walls yielding transversely, while the springs, having but a relatively small movement, continue to exert an approximately constant pressure. The constant pressure apparatus 20 thereupon permits sufficient fluid to escape from the gasket to maintain a pressure therein equivalent to the pressure exerted by the springs. Similarly, as the units cool off and contract or recede from each other, the side walls of the gasket are relieved of distorting pressure and return toward each other, and the same constant pressure apparatus adds fluid to the gasket and thus holds its internal pressure constant. It is obvious from the foregoing description that there will be exerted no unbalanced external forces on the turbine casing and necessarily no resultant strains therein to cause it to give so as to interfere with the blades or revolving wheels.

In Fig. 2 there is shown a modification of the invention wherein the spring means illustrated in Fig. 1 are replaced by internal fluid-pressure controlled gaskets, 23 and 24. These are placed on the opposite side of the flange from the gasket 16, and a follower plate 25 is added. In order to balance the forces exerted by these two gaskets, a fourth gasket 26 of the same form as the others is placed between the flanges. The four gaskets are connected together by a plurality of nipples 18a and tubes 19a similar to those already noted, and by means of a constant pressure maintaining apparatus 20, the system is operative in the same manner heretofore described. In this illustration, the flanges are shown shaped as at 27 to conform to a portion of the gasket exterior. This is only one form of the many grooves or recesses that might be turned in the flange for the purpose of accurately locating the gasket and for assisting in retaining it in position, through portions or extensions on the flanges 6 and 7 extending to a greater or less degree along one or both sides of the gasket.

In Fig. 3, another modification of the invention is shown, wherein two gaskets 16 and 26, similar to those already described, are placed on opposite sides of the flanges, and connected by a plurality of nipples 18b and tubes 19b. Flange 8 is internally threaded at 28 to accommodate a member 29 provided with a flanged portion 30 adapted to project therefrom in a direction opposite to that of flange 8, and to form a bearing surface for the gasket 26. In the assembly of this type of joint, the two main flanges 7 and 8 are located in proper spaced relation, after which the gasket 16 is placed between them and the gasket 26 placed on the opposite side of flange 7, the flanged inner member 29 is then turned into the threaded opening of flange 8 until its flanged portion 30 is the same distance from one side of flange 7 as flange 8 is from the opposite side. Fluid pressure is then supplied by the constant pressure maintaining apparatus 20 until the desired pressure is established in both gaskets 16 and 26. It is to be noted that in this form of construction, the bolts, nuts, washers and springs, are dispensed with, and the flanges are blank.

In Fig. 4, there is shown a modification wherein the flanges on the juxtaposed conduit ends are turned outwardly rather than inwardly, the fluid pressure gasket 16 being disposed adjacent the interior of the conduit or nearly in line with the walls of the conduit sections, and the pressure balancing or resisting bolts 11 are provided as in Fig. 1, except that they are disposed toward the outer or remote edges of the flanges. The action of the gasket is to maintain a fluid-tight seal between the conduit sections, and the resiliently restrained bolts serve to counterbalance forces acting to separate the ends of the conduit sections. The outer edge of the flange 8 has secured thereto, as by bolts or screws, a cylindrical ledge or dam 36 extending upward to a distance beyond that corresponding to the maximum separation of the conduit ends, this dam serving to confine a body of fluid which constitutes a seal at the outer side of the gasket 16. It will be apparent that, in case of any leakage through the joint formed by the flexible gasket, this leakage will be made apparent by change in level of the body of fluid confined by the dam 36. In order to more thoroughly insure against leakage from the sealing space within the dam 36, rubber or the like sealing washers 38 may be placed between the lower face of the flange 8 and the upper face of the unit on the lower end of the bolt 11. At the radially inner side of the conduit section 6, there is provided one or more barriers 37, preferably held in place by bolting or screwing to the inner wall of a conduit section 6, these barriers serving to insure against any portion of the gasket being materially displaced or forced into the interior of the conduit sections.

In Fig. 5, there is shown a further modification along the line of that disclosed in Fig. 2, and in accordance with which the seating portions of the conduit ends and their flanges 7 and 8 are provided with recessed seats 41, 42, respectively, of such curvature and cross-sectional shape as to approximately fit the outer wall of the flexible gasket under normal operating conditions. Through this latter arrangement, increased surface contact is provided between the outer surface of the gasket 16 and the cooperative surface portions of the conduit ends or their flanges. As a result of this arrangement, an increased sealing effect is secured, and likewise, the cooperation of the gasket with the recessed seating portions of the flanges assists in maintaining the gasket against displacement from a definite operating position relative to the conduit ends. Likewise, effective sealing by the gasket is insured in spite of misalinement of the conduit sections.

In Fig. 6, there is shown a modified form or application of the invention which has particular advantages where there is relatively little head room for the manipulation of the flexible gasket into operative position between conduit sections 5 and 6 which are of ordinary construction and fixedly mounted in position, these conduit sections being shown as provided with flanges 7 and 8, respectively, apertured at 9 and 10 respectively, as described in connection with Figs. 1, 4 and 5, as for the reception of retaining bolts. As indicated, a hollow flexible and resilient gasket 16 is disposed between the flanges 7 and 8, preferably seating within recesses 41 and 42 of curved cross-sectional outline in the flanges 7 and 8, respectively. This gasket is preferably mounted upon a sheet metal rim or carrier 45 externally concave in cross-sectional outline for reception of the radially inner side of the gasket 16 which, when in deflated condition, may be forced over the rim into the position indicated, wherein the rim frictionally engages the gasket to sufficient extent to cause the gasket to remain in position on the rim, that is, so as to permit the rim or carrier and the gasket to be handled as a unitary device. With the gasket thus retained in position on the rim, the gasket may be readily inserted transversely between the flanges 7 and 8 and into operative position indicated. With the gasket in operative position, it may be inflated to the required extent by admitting fluid under pressure from the reservoir 20 through the inlet conduit 19, under which conditions, as the conduit sections 5 and 6 approach and recede from each other, the thickness of the gasket will be correspondingly varied, at all times maintaining the desired fluid-tight seal between the flanges 7 and 8, with the gasket exerting a substantially uniform pressure against the flanges.

A water seal for the joint may be provided by a two-part circular rim or dam 46 disposed externally of the flanges 7 and 8 and having an inner extension at its lower side for cooperation with and permanent securing upon the flange 8. As indicated, the several sections of the retaining rim 46 may have flanges turned up at the abutting edges or ends of the sections for the reception of securing or clamping bolts which serve to hold the sections in place on the flange 8. A sealing ring 48 is preferably disposed between the outer edge of the flange 8 and the correspondingly inner side of the inwardly turned extension on the rim or dam 46, the securing of the several sections of the latter through its flanges 47 serving to clamp the sections against the sealing ring so as to maintain a fluid tight enclosure. As indicated, the space within the retaining rim or dam 46 and radially outside of the gasket may be filled with a fluid to the required depth. As indicated, the apertures 9 and 10 in the flanges 7 and 8 respectively may be closed with a plug of hardening plastic or a screw plug of the general form shown, so as to effectively close off the sealing chamber formed by the retaining rim or dam 46.

In Fig. 7, there is shown a form of joint which is quite similar to that of Fig. 5, the restraining bolts 11 and their appurtenant parts being omitted, the flexible gasket 16 serving to maintain itself in position and to maintain an effective sealing of the space within the conduit sections during normal operation.

In Figs. 8 and 9 there is shown a modification especially adapted for use where low head room is available and the axial length of the joint is relatively short, this modification permitting use of conduit sections and flanges of standard design and construction. In accordance with the disclosure of these figures, a trough or pan 51 is provided, the same comprising a bottom plate 52 having a square outer periphery and a circular inner periphery, with an inner flange 53 turned up or otherwise secured in position to form an inner cylindrical retaining wall serving to maintain the gasket 16 in operative position. An outer retaining wall 54 is turned up or otherwise secured in position about three sides of the bottom plate 52. An annular sheet 55 of rubber, or the like packing or sealing material, is cemented or otherwise secured in position at the upper side of the flange 8 or the lower side of the bottom plate 52, so as to serve, when the parts are in operative position, to seal the joint between the flange 8 and the bottom of the trough or pan 51.

For assembling the parts of this joint, the gasket 16, in deflated condition, is placed in the trough 51, the gasket surrounding the inner retaining ring or wall 53; and the trough or carrier with the gasket therein is inserted into the space between the flanges 7 and 8 by movement transverse to the axis of the conduit sections, such insertion being permitted by reason of the fact that one side of the trough or pan 51 is not provided with the outer flange or wall. When the carrier and the gasket are in operative position, as indicated in Figs. 8 and 9 (the conduit section 5 being removed in the latter figure), with the gasket suitably alined with the flanges 7 and 8 and the surrounding wall 54 in substantial engagement with the outer periphery of the flange 7 along three sides of this wall 54, thus confining the trough against movement in the three corresponding directions, a wall or flange 54$^a$ may be riveted, soldered or otherwise connected in fluid-tight manner to the corresponding edge of the bottom plate 52 at the open side of the trough or pan, this wall 54$^a$ cooperating with the wall or flange 54 to form a fluid-tight enclosing wall for the trough or pan outside of the gasket and the flanges 7 and 8. The position of the wall 54$^a$ is such that it is in substantial engagement with the flange 7, thus cooperating with the flange or wall 54 in limiting the movement of the pan 51 and the gasket 16.

Pressure is applied to the gasket 16 through the conduit 19, in a manner described hereinabove, so as to establish the required sealing pressure within the gasket. An exhaust conduit may be provided similar to and arranged in the same manner as the exhaust conduit of the gasket described hereinabove, this exhaust conduit having a valve 22 and preferably passing through an aperture in the bottom plate 52 of the trough or pan 51, the arrangement being such to form a fluid-tight joint between the pan and this conduit.

As indicated, the lower face of the flange 7 may be provided with an annular recess 41 of curved cross-sectional outline for the reception of and cooperation with the upper side of the gasket 16; and the bottom plate of the trough 51 may, as shown, be provided with an annular recess of corresponding outline for the reception of and cooperation with the gasket 16; or these surfaces of the lower face of the flange 7 and the bottom of the trough 51 which cooperates with the gasket 16 may be plane.

In accordance with the disclosure in Fig. 10, features of the invention are applied to a telescopic form of joint between the conduit sections 5a and 6a which are so mounted that their respective ends are adapted to approach and recede from each other to a limited extent. As indicated, the upper end of the conduit section 6a is provided with a bell-shaped enlargement 56 forming an internal shoulder 57 on the section 6a outside of the lower end of the conduit section 5a. The flexible resilient hollow gasket 58 is of somewhat different form from the gasket 16 heretofore described, in that the larger axis thereof through a cross-section of the gasket, is at right angles to the corresponding axis of the gasket of the other figures. However, this gasket is subject to or capable of being deflated and inflated so as to maintain a desired sealing engagement between an inner wall of the enlarged portion 56 of the lower conduit section and the exterior of the conduit section 5a at its lower end, this portion of the latter conduit section being preferably machined to provide a fairly smooth surface; and the gasket is of such dimensions as to be readily insertible to operative position indicated. A retaining ring 59 may be mounted in position upon the upper end of the lower conduit section, this ring serving to prevent withdrawal of the gasket 58 from normal operative position adjacent the shoulder 57. The space within the flange 56 above the gasket 58 may be filled with sealing fluid to a suitable level.

With the type of joint shown in Fig. 10, it may be preferable that the conduit section 6a be removably connected in a telescopic manner to a main conduit section associated with a condenser or the like, or that the conduit section 5a be similarly removably connected to a main conduit section associated with the exhaust of a turbine or the like. With this arrangement, the flexible gasket 58 may be more readily inserted in deflated condition to operative position on the shoulder 57, and the conduit section 6a or 5a, depending on which is movable, then moved to operative position and secured therein. With pressure applied to the interior of the gasket, through the inlet conduit 19, the gasket is then operative to force its radially inner and outer walls into desired sealing engagement with the outer wall of the conduit sections 5a and the inner wall of the enlargement or flange 56, respectively, thus maintaining the desired operative relation as the conduit sections approach and recede from each other due to heating and cooling of these parts.

In Fig. 11, there is shown the general form of gasket 16 which is used in the joint of Figs. 1, 3, 4, 5, 6, 7, 8 and 9 with desirable results, the normal condition of the gasket being indicated in full lines and its condition when inflated to the maximum extent ordinarily required in operation, being shown in dotted lines.

Ordinarily, the gasket shown is inserted to operative position when the turbine and condenser have been inoperative for some time, and hence, the conduit sections and flanges are in relatively cool condition and consequently separated to such a considerable degree as readily permits insertion of the gasket in a direction transverse to the axis of the conduit sections. If it should happen that the conduit sections are so close together as to prevent bodily insertion of the gasket in its normal or deflated condition, it may be necessary to initially compress the gasket by the application of external pressure thereto, or subjecting the interior to a partial vacuum, prior to insertion of the gasket to operative position. With the gasket in the position indicated, pressure to the required degree is admitted thereto through the conduit 19, so that the upper and lower faces of the gasket are urged into sealing arrangement with the corresponding faces of the flanges 7 and 8.

A point of particular note in connection with the present invention is that it has special applicability to apparatus in which special alinement of parts and the maintaining of relative positions of parts are important considerations, as in the case of a steam turbine and condenser, for example, wherein the condenser is supported from a fixed platform and the turbine is separately supported, and it is desired to provide a tight and constant joint between the condenser and the engine. The problem is created due to expansion and contraction of the material, and the solution amounts to providing means for maintaining substantially the same surface pressure at, and completely around, the joint, whether the parts are spaced a certain distance or are disposed three-eights of an inch more or less nearer together.

In Fig. 12, there is shown a modification, embodying flanges 7 and 8 provided with opposed recesses 61 and 62, respectively, having their inner wall along a plane surface and having inclined side walls, as indicated at 63, for cooperation with the outer surface or correspondingly shaped reinforcing seating pads attached to or formed with the gasket 16. It will be apparent that the uniform pressure within the gasket 16 serves to force the reinforcing seating pads into secure sealing engagement with the walls of recesses 61 and 62 in the flanges 7 and 8, respectively, independently of variation in the distance between the flanges.

In the modification shown in Fig. 13, recesses 41 and 42 are provided on the opposed surfaces of the flanges 7 and 8 for cooperation with correspondingly shaped reinforcing seating pads 65 on the hollow flexible gasket. It will be apparent that during normal operation, pressure within the gasket 16 forces these seating pads 65 into cooperable sealing engagement with the walls of recesses 41, 42 in the flanges 7 and 8.

It will be apparent that a retaining rim similar to the rim or carrier 45 of Fig. 6, may be associated with the flexible gasket shown in any of the figures, as, a support or mounting for any such gasket, especially for facilitating handling and positioning of the gasket even when the latter is in normal deflated condition.

Although the particular embodiments of the invention illustrated herein are shown as connecting a turbine engine and a condenser, it is to be understood that such connections might be placed between any units which are subjected to varying temperatures or require means to compensate for expansion and contraction, and the scope of the invention is not to be limited to one such connection in a system but is to be understood to cover a plurality of such connections where more than one is necessary to best balance the expansive and leakage forces.

As many changes could be made in the above construction and as many apparently widely different embodiments of the invention might be made without departing from the scope thereof, it is intended that all matter contained in the foregoing description or shown in the accompanying drawings shall be interpreted as illustrative and not in a limiting sense.

It is claimed and desired to secure by Letters Patent:

1. In apparatus of the character described, in combination, two conduit sections having portions of their adjacent ends in spaced relation and adapted for relative approach and recession to a substantial extent means for sealing the space between end portions of said conduit sections against leakage of fluid thereacross, said means comprising a flexible hollow gasket in sealing engagement with one of said conduit sections, a carrier for said gasket, said gasket with its carrier being insertible transversely of the axis of said conduit sections to operative position therebetween, and means for automatically maintaining a substantially constant pressure within said gasket in spite of relative movement of the portions of said conduit sections which said gasket engages.

2. In apparatus of the character described, in combination, two independently supported conduits having their adjacent ends in spaced relation and adapted for relative approach and recession to a substantial extent, a relatively stiff plate-like carrier disposed between and apertured in alinement with the passage through said conduits, a flexible hollow gasket disposed between said adjacent conduit ends and mounted on said carrier with said gasket in sealing engagement with the end of one of said conduits and said carrier, and means for sealing the joint between said carrier and the end of the other of said conduits, said carrier being movable with said gasket thereon transversely of said conduits into and out of operative position with respect thereto.

3. In apparatus of the character described, in combination, two independently supported conduits having their adjacent ends in spaced relation and adapted to approach and recede from each other, a relatively stiff plate-like carrier disposed between and apertured in alinement with the passage through said conduits, a flexible hollow gasket disposed between said adjacent conduit ends and mounted on said carrier with said gasket in sealing engagement with the end of one of said conduits and said carrier, and means for sealing the joint between said carrier and the end of other of said conduits, said carrier having a retaining flange about its inner periphery and being insertible with said gasket to operative position by movement transversely of the passage through said conduits.

4. In apparatus of the character described, in combination, two independently supported conduits having their adjacent ends in spaced relation and adapted to approach and recede from each other, a relatively stiff carrier disposed between and apertured in alinement with the passage through said conduits, a flexible hollow gasket disposed between adjacent ends of said conduits and mounted on said carrier with said gasket in sealing engagement with the end of one of said conduits, said carrier having an outer peripheral flange engageable with the end of one of said conduits and adapted to maintain said carrier and said gasket in operative position, and means for automatically maintaining substantially constant pressure within said gasket in spite of substantial movements of approach and recession of the adjacent ends of said conduit sections.

5. In apparatus of the character described, in combination, two independently supported and alined conduits having their adjacent ends in spaced relation and adapted to approach and recede from each other, a relatively stiff plate-like support disposed between and apertured in alinement with the passage through said conduits, a flexible hollow gasket disposed between adjacent ends of said conduits and carried by said support with said gasket in sealing engagement with the end of one of said conduits and said support, and means for sealing the joint between said support and the other of said conduits, said support having an inner retaining flange and an outer peripheral flange extending across and engageable with the end of one of said conduits and serving to maintain said support and said gasket in operative position.

6. The method herein described of providing a flexible joint or coupling between spaced members of a fluid conduit, which consists in mounting an annular, flexible, tubular gasket on a tray-like apertured support therefore having a peripheral flange interrupted at one side, passing a portion of said tray with said gasket mounted thereon between the spaced ends of said conduit sections while said gasket is somewhat flattened in an axial direction, causing flexure of the walls of said gasket to increase the axial length of the gasket and force portions thereof into fluid-tight seating engagement with the end of one of said conduit members and the bottom of said tray and said tray into seating engagement with the end of the other conduit member, and forming a flange-like projection on said tray to complete the interrupted portion of the flange on said tray.

7. In apparatus of the character described, in combination, two independently supported and substantially alined conduit sections having their ends in spaced relation and adapted for relative approach and recession to a substantial extent, a flexible hollow gasket, and a rim or carrier upon which said gasket is mounted, said gasket being disposed between said adjacent conduit ends and in sealing engagement with one of said conduit ends, said carrier being apertured in alinement with the passage through said conduits and said carrier with said gasket mounted thereon being insertible transversely of the axis of said conduit sections to operative position between the opposed ends thereof with a portion of said carrier disposed radially inside of said gasket.

8. In apparatus of the character described, in combination, two independently supported and substantially alined conduit sections having end portions in spaced relation and adapted for relative approach and recession to a substantial extent, a flexible hollow gasket, and a rim or carrier apertured in alinement with said conduit sections and upon which said gasket is mounted, said gasket being disposed between adjacent end portions of said conduits and in sealing engagement with one of said end portions, said carrier with said gasket mounted thereon being insertible transversely of the axis of said conduit sections to operative position with respect to said conduit sections.

9. In apparatus of the character described, in combination, two independently supported and substantially alined conduit sections having their ends in spaced relation and adapted for relative approach and recession to a substantial extent, the end portion of one of said conduit sections being in the form of an integral flange, means for sealing the space between said conduit end portions, said means comprising a flexible hollow gasket, and a rim or carrier upon which said gasket is mounted, said gasket being disposed between said flange on one conduit section and the end portion of the other conduit section and operative to cause said means to effect sealing engagement with said conduit end portions, said carrier being apertured in alinement with the passage through said conduits, and said carrier with said gasket mounted thereon being insertible transversely of the axis of said conduit sections to operative position between the end portions thereof with a portion of said carrier disposed radially inside of said gasket.

In testimony whereof the signature of the inventor is affixed hereto.

BASIL W. DENNIS.